(No Model.)

S. W. MUNN.
CUTTING AND JOINT INDICATING DEVICE FOR WELL TUBES OR CASINGS.

No. 598,805. Patented Feb. 8, 1898.

WITNESSES:
Jos. A. Ryan
Amos W. Hart

INVENTOR
Silas W. Munn.
BY Munn & Co.
ATTORNEYS.

UNITED STATES PATENT OFFICE.

SILAS W. MUNN, OF MANNINGTON, WEST VIRGINIA.

CUTTING AND JOINT-INDICATING DEVICE FOR WELL TUBES OR CASINGS.

SPECIFICATION forming part of Letters Patent No. 598,805, dated February 8, 1898.

Application filed September 9, 1897. Serial No. 651,106. (No model.)

*To all whom it may concern:*

Be it known that I, SILAS W. MUNN, of Mannington, in the county of Marion and State of West Virginia, have invented a new and useful Improvement in Cutting and Joint-Indicating Devices for Well Tubes or Casings, of which the following is a specification.

The iron tubes or casings of Artesian or driven, salt, gas, or oil wells sometimes require to be cut or divided transversely for the purpose of removing a section, and while it is desirable to make the cut or division in close proximity to a joint or coupling of the tube or casing it is often a matter of much difficulty. I have therefore devised for and applied to a tube or casing cutter a simple but efficient device for automatically indicating the location of the joint or coupling and at the same time arresting the descent of the cutter at the right point for dividing the tube or casing.

The construction, application, and operation of my invention are hereinafter described with reference to the accompanying drawings, in which—

Figure 1:
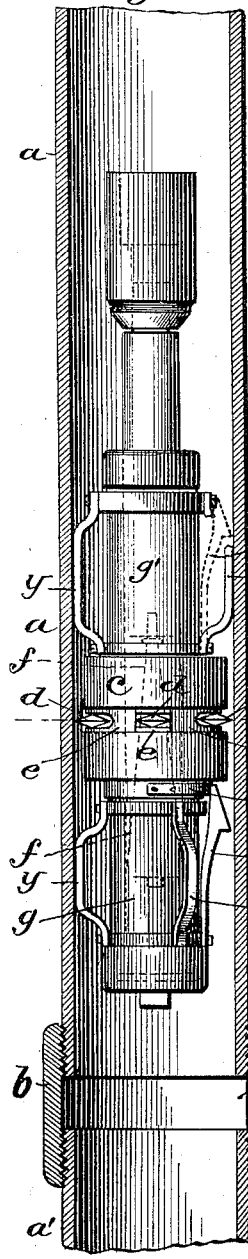
Figure 2:
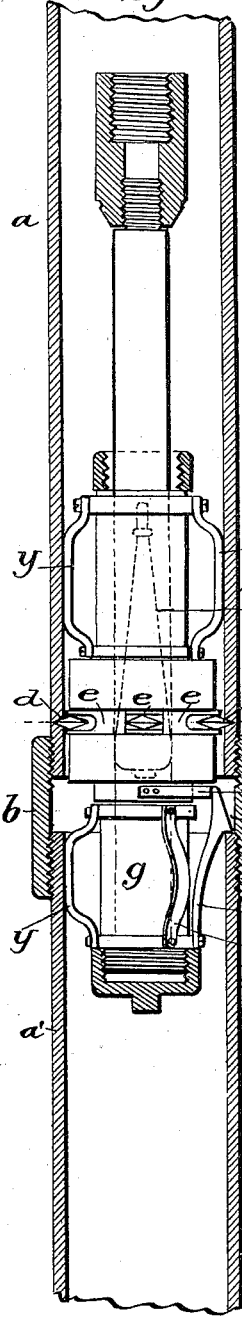
Figure 3:
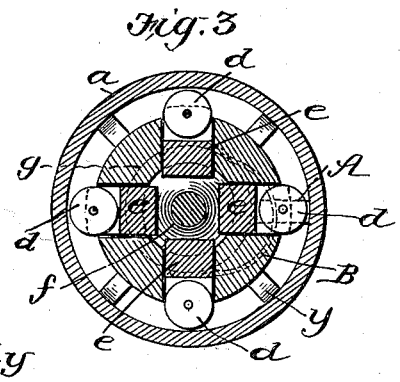
Figure 4:
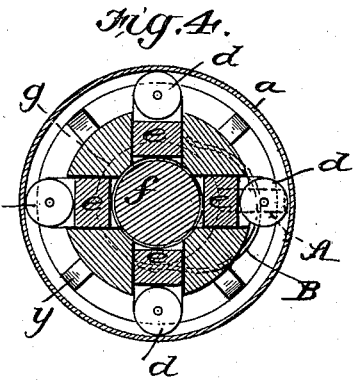

Figure 1 is a longitudinal section of a well tube or casing and a cutting apparatus therein with my joint-indicating device attached, the said apparatus being shown descending to the position where it is to be operated. Fig. 2 is a similar view, save that my attachment is shown engaged with the joint and the cutting apparatus located at the point where the tube is to be divided. Figs. 3 and 4 are horizontal sections showing the parts in the same relative positions as in Figs. 1 and 2, respectively.

$a\ a'$ designate alined sections, and $b$ the screw-coupling, of a tube or casing for Artesian or driven wells.

$c$ is a cylindrical and rotatable cutter-head having a series of horizontal steel cutters $d$ journaled in radially-slidable blocks $e$, held in slots in said cutter-head and adapted to be projected therefrom by means of a tapered and slidable expander $f$ to cause the cutters $d$ to engage the tube or casing section $a$.

My improved joint-indicating device is constructed in the form of a spring-catch A and is preferably attached to the lower portion of the cutting apparatus. The said catch is arranged vertically and the lower end of its shank secured by rivets or otherwise to the extension $g$ of the cutting apparatus, while its beveled and shouldered upper end is in contact with the convex plate-spring B, which is arranged horizontally and attached at one end to the extension $g$, so as to extend part way around the same, as shown. Thus the catch A is held normally projected, so as to press against the tube or casing section $a$ in descending the same, as shown in Fig. 1, and to cause it to project into the cavity $x$ in the joint or coupling $b$ and thereby engage the end of the lower tube-section $a'$, as shown in Fig. 2, by which engagement it obviously arrests the farther descent of the cutters $d$ and practically locates them at a point just above the coupling $b$, where the tube $a$ is to be divided. Then when the expander $f$ is drawn up and the cutting apparatus is rotated the catch A will ride around on the end of tube-section $a'$ and continue to hold the cutting apparatus in due working position.

It is obvious the beveled head of the catch A enables it to ride over the shoulder or end of tube-section $a$ when the cutting apparatus is drawn out.

It will be noted that one or more guards $y$ may be located on the side of the extension $f$ opposite the catch A for holding the latter in position to make the engagement with tube-section $a'$ before described.

In Fig. 1 I show the catch by dotted lines attached to the upper portion or extension $g'$ of the cutter. In such case it is apparent the catch will not engage the tube-joint until the cutters pass below the latter, which will permit the pipe to be severed at a lower point than when the catch is applied as shown by full lines.

What I claim is—

1. The combination, with the rotatable well tube or casing cutter, of the spring-catch, attached to the lower or upper extension of the same, and arranged vertically, and provided with a beveled head, whereby it is adapted for automatic engagement with a joint of such tube or casing and for extraction therefrom, as shown and described.

2. The combination with a cutter for a well tube or casing, of an automatic device for engaging a joint in said tube or casing, the same consisting of a beveled catch attached to the lower portion of the cutter, and arranged vertically, and a spring which projects the device laterally, as shown and described.

SILAS W. MUNN.

Witnesses:
A. L. PRICHARD,
W. H. NICHOLSON, Jr.